(12) United States Patent
Lee et al.

(10) Patent No.: US 7,349,785 B2
(45) Date of Patent: Mar. 25, 2008

(54) METHOD OF CONTROLLING CLUTCH SLIP DURING GEAR SHIFTS OF AN AUTOMATIC TRANSMISSION

(75) Inventors: Chunhao J. Lee, Troy, MI (US); Kumaraswamy V. Hebbale, Troy, MI (US); Chi-Kuan Kao, Troy, MI (US); Farzad Samie, Franklin, MI (US); Richard W. Carlson, Warren, MI (US)

(73) Assignee: General Motors Corporation, Detroit, MI (US)

( * ) Notice: Subject to any disclaimer, the term of this patent is extended or adjusted under 35 U.S.C. 154(b) by 734 days.

(21) Appl. No.: 10/813,898

(22) Filed: Mar. 31, 2004

(65) Prior Publication Data

US 2005/0222736 A1 Oct. 6, 2005

(51) Int. Cl.
*G06F 19/00* (2006.01)
*B60W 10/02* (2006.01)

(52) U.S. Cl. .............................. 701/67; 701/51; 477/34; 477/39; 477/70; 477/90

(58) Field of Classification Search .................. 701/51, 701/67–68; 477/34, 39, 70, 90, 107, 110, 477/166, 180
See application file for complete search history.

(56) References Cited

U.S. PATENT DOCUMENTS

| | | | | |
|---|---|---|---|---|
| 4,928,227 | A * | 5/1990 | Burba et al. | 701/66 |
| 6,110,068 | A * | 8/2000 | Kraska | 475/146 |
| 6,299,565 | B1 | 10/2001 | Jain et al. | 477/143 |
| 6,695,108 | B1 * | 2/2004 | Hanke et al. | 192/3.29 |
| 7,044,888 | B2 * | 5/2006 | Lee et al. | 477/167 |

* cited by examiner

*Primary Examiner*—Yonel Beaulieu

(57) ABSTRACT

A method is provided for controlling engagement of a clutch which carries torque before, during and after a shifting event in a transmission which is connected to a throttle-controlled engine. The method includes providing a feed forward input command which increases as the engine torque increases and decreases as the engine torque decreases. A feed-back input command is provided as a function of the error between measured clutch slip and a reference slip profile. The feed-forward input command and feed-back input command are summed to provide a clutch control command for controlling engagement of the clutch before, during and after the shifting event to allow a desired amount of clutch slip to damp excitation of the transmission.

18 Claims, 1 Drawing Sheet

METHOD OF CONTROLLING CLUTCH SLIP DURING GEAR SHIFTS OF AN AUTOMATIC TRANSMISSION

TECHNICAL FIELD

The present invention relates to a method of controlling engagement of a clutch which carries torque before, during and after a shifting event in an automatic transmission, wherein feed-forward and feed-back input commands are used to achieve a desired slip profile to minimize objectional vibrations during gear shifting.

BACKGROUND OF THE INVENTION

In a conventional automatic transmission, a torque converter is typically included in the driveline. It is located between the crankshaft of an internal combustion engine and the transmission gearing that establishes torque flow paths to the vehicle wheels. The function of the torque converter is to provide fast and smooth vehicle launch via its torque multiplication and driveline torsional damping capabilities. Due to the nature of the fluid coupling in the torque converter, a certain amount of energy is lost in the fluid as the turbine slips with respect to the engine speed, which results in efficiency losses and a corresponding reduction in vehicle fuel economy. Starting clutch technology may provide a more fuel efficient device for vehicle launch as a replacement for the torque converter.

The fluid coupling of the torque converter is effective at preventing excitation of the vehicle driveline as a result of engine vibrations because the vibrations are dissipated in the torque converter fluid. However, if a starting clutch is used to replace the torque converter, then the starting clutch must be controlled to prevent such excitation of the vehicle driveline and to provide a vehicle launch which is as smooth as that of a torque converter equipped vehicle.

The absence of the torque converter also leaves the driveline with no damping during gear shifting. Consequently, the driveline may vibrate or "ring" during the shift, which may cause objectionable torsional vibration on the vehicle.

SUMMARY OF THE INVENTION

In order to provide vibration damping during shifts in a transmission, the present invention proposes slipping a clutch in a controllable manner to minimize the torsional excitation. For this control, it is necessary that the clutch must be carrying torque in both the original gear and the new gear. The control algorithm controls the input force, such as the pressure of the piston or the current of the associated electric device, of the clutch so that the clutch slips when the damping affect is required. The algorithm implements a feed-forward control command based on an engine operating parameter, such as throttle position, gas pedal position or calculated engine torque, and a feed-back control command based upon an error between clutch slip and a reference profile. The final control pressure or clutch control command is the sum of the feed-forward control command and feed-back control command.

More specifically, the present invention provides a method of controlling the engagement of a clutch which carries torque before, during and after a shifting event in a transmission which is connected to an engine. The method includes the steps of: a) providing a feed-forward input command which increases as the engine torque increases, and decreases as the engine torque decreases; b) providing a feed-back input command which is a function of the error between measured clutch slip and a reference slip profile; and c) summing said feed-forward input command and said feed-back input command to provide a clutch control command for controlling engagement of the clutch before, during and after the shifting event to allow a desired amount of clutch slip to damp excitation of the transmission. The clutch control command preferably controls hydraulic pressure applied within the clutch.

The reference slip profile includes: a normal driving portion in which a low slip or zero slip amount is maintained; a pre-shift portion in which slip is increased from the low slip amount to a medium slip amount when approaching a vehicle shift speed; a during-shift portion in which slip increases from the medium slip amount to a peak slip amount and then decreases to a low slip amount; and a post-shift portion in which a low slip or zero slip amount is maintained.

The controlled clutch may be a range clutch positioned inside the transmission or an input clutch or a converter clutch inside a torque converter positioned between the transmission and the engine.

The above features and advantages, and other features and advantages of the present invention are readily apparent from the following detailed description of the best mode for carrying out the invention when taken in connection with the accompanying drawings.

DESCRIPTION OF THE PREFERRED EMBODIMENTS

Figure 1:
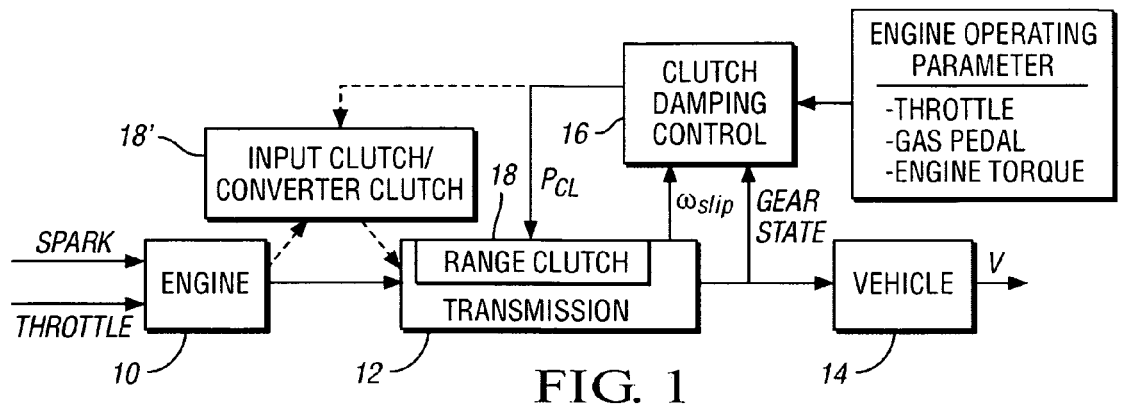
FIG. 1 shows a schematic diagram of a system for controlling engagement of a clutch in accordance with the invention.

Referring to FIG. 1, a system for controlling engagement of a clutch is schematically illustrated in accordance with the present invention. As shown, the engine 10 receives spark and throttle inputs, and transmits torque to the transmission 12. The output torque from the transmission 12 drives the vehicle 14 at a speed V. The clutch damping control 16 receives as inputs the measured clutch slip ($\omega_{slip}$), the transmission gear state, and an engine operating parameter. The engine operating parameter may be throttle position, gas pedal position, or calculated engine torque. In response, the clutch damping control outputs a clutch control command $P_{CL}$ which controls engagement of the range clutch 18 before, during and after a shifting event in which the range clutch is engaged before, during and after the event.

FIG. 1 also illustrates an alternative embodiment of the invention, wherein an input clutch 18' is provided between the engine 10 and the transmission 12, and is controlled by the clutch damping control 16. In a further alternative embodiment, the controlled clutch or input clutch may be a torque converter clutch.

The clutch control command $P_{CL}$ controls hydraulic pressure applied within the range clutch 18 in a manner to provide a desired amount of clutch slip in the range clutch 18 to achieve a desired damping effect. The clutch control command $P_{CL}$ may alternatively control current in an electric device which controls clutch application, as opposed to controlling hydraulic pressure of the clutch.

Figure 2:
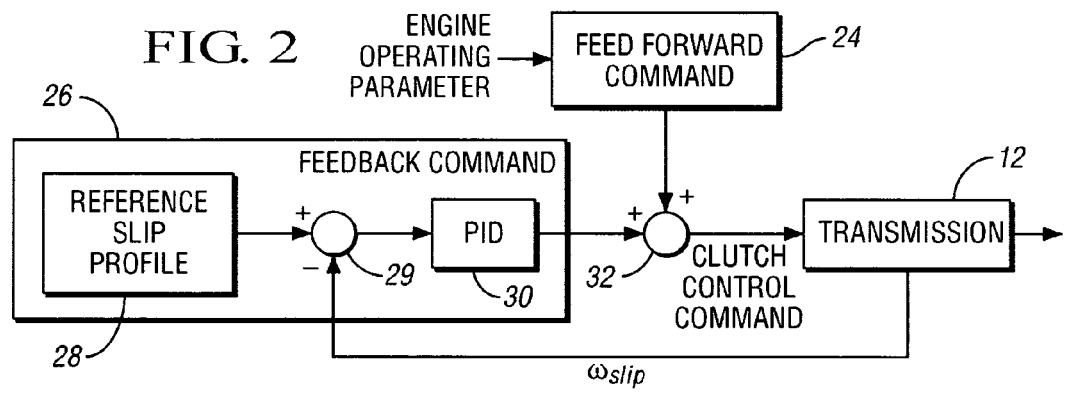
FIG. 2 shows a schematic flow chart of a control algorithm in accordance with the invention.

Turning to FIG. 2, a control algorithm for controlling engagement of the clutch 18 is shown schematically. As illustrated, the control algorithm includes a feed-forward command block 24 which receives as an input an engine operating parameter, such as throttle position, gas pedal position or calculated engine torque. A feed-back command block 26 compares a reference slip profile 28 to a measured clutch slip ($\omega_{slip}$) at the subtraction block 29 to determine an error, and operates on the error in a proportional integral derivative block 30 before outputting a feed-back command which is summed with the feed-forward command 24 at the summation block 32. From the summation block 32 a clutch control command is sent to the transmission 12 to control engagement of the clutch 18.

Accordingly, the control algorithm consists of two parts: a feed-forward input command 24 which is a function of an engine operating parameter, such as throttle position, gas pedal position or calculated engine torque (the feed-forward command 24 increases when the engine torque increases and decreases when the engine torque decreases); and a clutch slip speed feed-back input command 26, which is a function of the error between clutch slip ($\omega_{slip}$) and the reference slip profile 28.

Figure 3:
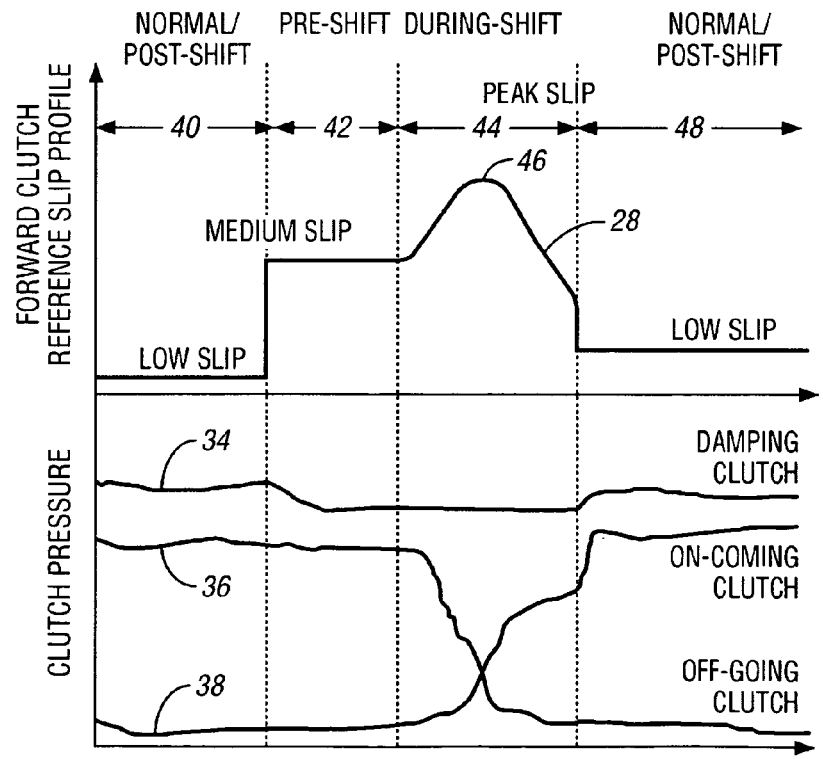
FIG. 3 shows a graphical illustration of pressure and clutch slip profiles vs. time for use with the present invention.

The reference slip profile 28 of the feed-back command 26 is divided into four parts, and is illustrated in the time chart of FIG. 3. In FIG. 3, the line 28 is the reference slip profile, the line 34 is the clutch pressure for the controlled clutch, the line 36 is the clutch pressure for the off-going clutch, and the line 38 is the clutch pressure for the on-coming clutch. The chart of FIG. 3 corresponds with a steadily increasing vehicle speed with time (along the horizontal axis).

In the normal/post-shift mode 40, a small reference slip is commanded so that the forward clutch is at the threshold of slipping as the up-shift point is approached. This low slip amount is preferably approximately 0-25 rpm. Just before the up-shift point, the reference slip profile increases to a medium slip amount, such as approximately 50 to 100 rpm, in the pre-shift portion 42 of the reference slip profile 28. This increase to approximately 100 rpm of slip initiates the reduction of the applied clutch pressure, but the actual clutch slip of the controlled clutch is kept at a minimum. In the during-shift portion 44 of the reference slip profile 28, the reference slip value increases from the medium slip amount to a peak slip amount 46 to force the forward clutch to slip. The peak slip amount 46 is preferably approximately 200 to 300 rpm to smooth out undesirable shift transients. Thereafter, the reference slip profile decreases to the secondary low slip amount of approximately 20-40 rpm, and stays at this low slip amount level during the normal/post-shift operation 48. This low-slip amount in the normal/post-shift portion 48 of the reference slip profile may be smaller than 20-40 rpm, or may be zero for normal operation in higher speeds.

Referring to the clutch pressure profile 34 for the damping clutch, the pressure profile is maintained substantially constant in the during-shift portion of the clutch profile, but the inertia torque creates clutch slip in this region.

This invention also enables the application of a torque converter clutch in lower gears and during gear shifts. Such a strategy results in improved fuel economy because the torque converter clutch may be locked up except during gear shifts, thereby reducing losses. The invention also enables the use of a starting clutch device in place of a torque converter. The strategy results not only in improved fuel economy, but also in mass reduction, as well as cost and packaging benefits for automatic transmissions.

While the best modes for carrying out the invention have been described in detail, those familiar with the art to which this invention relates will recognize various alternative designs and embodiments for practicing the invention within the scope of the appended claims.

The invention claimed is:

1. A method of controlling engagement of a clutch which carries torque before, during and after a shifting event in a transmission which is connected to an engine, the method comprising:

providing a feed-forward input command which increases as the engine torque increases, and decreases as the engine torque decreases;

providing a feedback input command which is a function of an error value equaling a calculated difference between a measured clutch slip and a reference slip profile; and summing said feed-forward input command and said feedback input command to provide a clutch control command for controlling engagement of the clutch before, during and after the shifting event to allow a desired amount of clutch slip to damp excitation of the transmission.

2. The method of claim 1, wherein said reference slip profile includes: a driving portion in which a first low slip amount is maintained; a pre-shift portion in which slip is increased from said first low slip amount to a medium slip amount when approaching a vehicle shift speed; a during-shift portion in which slip increases from said medium slip amount to a peak slip amount and then decreases to a second low slip amount; and a post-shift portion in which said second low slip amount is maintained.

3. The method of claim 2, wherein said clutch is a range clutch positioned inside the transmission.

4. The method of claim 2, wherein said clutch is an input clutch positioned between the transmission and the engine.

5. The method of claim 2, wherein said clutch is a torque converter clutch positioned between the transmission and the engine.

6. The method of claim 2, wherein said clutch control command controls hydraulic pressure applied within the clutch.

7. The method of claim 6, wherein said hydraulic pressure remains substantially constant in said during-shift portion of the shift profile, and inertia torque causes slip to increase to said peak slip amount.

8. A method of controlling engagement of a clutch which carries torque before, during and after a shifting event in a transmission which is connected to a throttle-controlled engine, the method comprising:

providing a feed-forward input command as a function of an engine operating parameter;

measuring clutch slip;

determining an error between said measured clutch slip and a reference slip profile to provide a feedback input command; and summing said feed-forward input command and said feedback input command to determine a clutch control command for controlling engagement of the clutch before, during and after the shifting event to allow a desired amount of clutch slip to damp excitation of the transmission.

9. The method of claim 8, wherein said engine operating parameter is selected from the group consisting of throttle position, gas pedal position, and calculated engine torque.

10. The method of claim 9, wherein said reference slip profile includes: a driving portion in which a first low slip amount is maintained; a pre-shift portion in which slip is increased from said first low slip amount to a medium slip amount when approaching a vehicle shift speed; a during-shift portion in which slip increases from said medium slip amount to a peak slip amount and then decreases to a second low slip amount; and a post-shift portion in which said second low slip amount is maintained.

11. The method of claim 10, wherein said clutch is a range clutch positioned inside the transmission.

12. The method of claim 10, wherein said clutch is an input clutch positioned between the transmission and the engine.

13. The method of claim 10, wherein said clutch is a torque converter clutch positioned between the transmission and the engine.

14. The method of claim 10, wherein said clutch control command controls hydraulic pressure applied within the clutch.

15. The method of claim 14, wherein said hydraulic pressure remains substantially constant in said during-shift portion of the shift profile, and inertia torque causes slip to increase to said peak slip amount.

16. A method of controlling engagement of a clutch which carries torque before, during and after a shifting event in a transmission which is connected to an engine, the method comprising:

providing a feed-forward input command which increases as the engine torque increases, and decreases as the engine torque decreases;

providing a feedback input command which is a function of an error value equaling a calculated difference between a measured clutch slip and a reference slip profile, wherein said reference slip profile includes: a driving portion in which a first low slip amount is maintained; a pre-shift portion in which slip is increased from said first low slip amount to a medium slip amount when approaching a vehicle shift speed; a during-shift portion in which slip increases from said medium slip amount to a peak slip amount and then decreases to a second low slip amount; and a post-shift portion in which said second low slip amount is maintained; and summing said feed-forward input command and said feedback input command to provide a clutch control command for controlling engagement of the clutch before, during and after the shifting event to allow a desired amount of clutch slip to damp excitation of the transmission.

17. The method of claim 16, wherein said clutch control command controls hydraulic pressure applied within the clutch.

18. The method of claim 17, wherein said hydraulic pressure remains substantially constant in said during-shift portion of the shift profile, and inertia torque causes slip to increase to said peak slip amount.

* * * * *